United States Patent

Pfaff et al.

[11] Patent Number: 5,939,190
[45] Date of Patent: Aug. 17, 1999

[54] ELECTROCONDUCTIVE TRANSFER TAPE

[75] Inventors: Ronald Pfaff; Claus Meyer, both of Hamburg, Germany

[73] Assignee: Beiersdorf AG, Hamburg, Germany

[21] Appl. No.: 08/946,551

[22] Filed: Oct. 7, 1997

[30] Foreign Application Priority Data

Dec. 10, 1996 [DE] Germany ............................ 196 42 178

[51] Int. Cl.⁶ ..................................................... B32B 7/12
[52] U.S. Cl. .......................... 428/344; 442/110; 442/151; 442/377; 442/379; 442/401; 428/354
[58] Field of Search .................................... 442/110, 149, 442/151, 377, 379, 401; 428/344, 343, 354; 427/208, 208.8

[56] References Cited

U.S. PATENT DOCUMENTS 4,113,981  9/1978  Fujita et al. ........................... 174/88 R
5,300,340  4/1994  Calhoun et al. .......................... 428/40
5,599,585  2/1997  Cohen ..................................... 427/250

FOREIGN PATENT DOCUMENTS

95/12643  5/1995  WIPO .

Primary Examiner—Daniel Zirker
Attorney, Agent, or Firm—Sprung Kramer Schaefer & Briscoe

[57] ABSTRACT

The use of a spunbonded nonwoven as backing material for an electrically conductive transfer tape, where the nonwoven is metallized by the application of at least one layer of metal, the nonwoven is provided on both sides with an adhesive coating, the mean thickness of the nonwoven being at least as great as the sum of the two thicknesses of the adhesive coats.

10 Claims, No Drawings

ELECTROCONDUCTIVE TRANSFER TAPE

The invention relates to the use of a spunbonded nonwoven as backing material for an electroconductive transfer tape.

Electroconductive transfer tapes are widely employed in the adhesive bonding of electronic contacts or in electromagnetic screening. They are used to help join electrical contacts or conductive, screening areas to one another without interrupting electrical contact. For electromagnetic compatibility (EMC), uninterrupted electrical conductivity of the corresponding housing or room, for example, is critical to the quality of screening.

Numerous methods have been developed to bring about electrical conductivity through the adhesive bond. Familiar methods are the addition of electrically conducting metal powders or carbon particles to appropriate adhesive (including pressure-sensitive adhesive) formulations. Above a certain level of filling of the particles in the pressure-sensitive adhesive composition there is contact between the electrically conductive particles and so the adhesive film attains electrical conductivity.

The U.S. Pat. No. 4,113,981 describes how, by adding carbon powder, metal powder or SiC powder, an electroconductive adhesive composition can be prepared. If the level of filling with these substances is below 30% by volume then the adhesive composition also becomes selectively conductive in the z direction, i.e. perpendicularly to the plane of the layer of adhesive composition or of the adhesive tape.

WO 95/12643 A1 describes electroconductive adhesive bonds which consist of a porous substrate. The substrate possesses numerous channels which penetrate the substrate. The walls of the channels are provided with a single or double layer of metal, the latter variant being preferred. The substrate is subsequently filled with a solution of adhesive and dried. The porous materials are porous polymer layers, wovens or nonwovens, which are provided with a copper/nickel layer or with an aluminium layer.

Other methods exist of bringing about conductivity only in the z direction.

It is common, for example, to add particles corresponding in size to the thickness of the layer of adhesive composition, in such a low level of filling that these particles are not in mutual contact and therefore do not produce a conductivity in the plane of the adhesive layer, and yet because of their size have contact with both surfaces of the adhesive film and thus at these sites allow electrical conductivity in the z direction (anisotropic conductivity).

U.S. Pat. No. 5,300,340 describes a transfer tape of this kind. In this tape, silverized glass beads or metal beads are incorporated into the adhesive composition. The diameter of these beads is at least as great as the thickness of the layer of adhesive composition. If pressure is then exerted on the transfer tape, for example in the course of bonding between two structures, each spherical cap of the beads projects from the layer of adhesive composition to either side of the transfer tape and thus ensures electrical contact between the structures.

However, numerous problems occur when using known electroconductive transfer tapes. For instance, the overall thickness of familiar unbacked transfer tapes is usually only 50 $\mu$m, rarely more than 100 $\mu$m. Both when using an isotropically conductive and when using an anisotropically conductive transfer tape the adhesive composition has only a low tear strength and a stability provided only by the framework polymer of the pressure-sensitive adhesive. This must be taken account of when handling the transfer tape, by first sticking the transfer tape on the adherend and then separating it from the release film or release paper. In the case of mechanical or manual bonding of transfer tapes, despite careful handling, there are often instances of tearing and thus of disruption to the production flow.

Because of this, electroconductive transfer tapes are used not in unbacked form but with an intermediate backing, provided that the isotropic conductivity does not interfere with the use of such transfer tapes. For this purpose an electrically conductive adhesive composition produced in accordance with the principles set out above is applied to both sides of the support backing (usually a copper foil). Other customary commercial products are able to do without the use of an embossed copper foil because the metal backing is embossed in such a way that the embossed points project through the adhesive composition. Understandably, these transfer tapes have a substantially greater thickness and a higher weight than the unbacked transfer tapes, which often entails disadvantages in the bonding of small contacts. Moreover, the reduced flexibility has an adverse effect on the production of an electrically conductive bond of screening materials on housing structures.

Since the trend is towards ever smaller electrical contacts to be bonded as far as possible by means of a transfer tape, the transfer tapes employed are becoming every narrower (for reasons of cost as well). Consequently, the requirements placed on transfer tapes are becoming ever higher: they must be sufficiently stable and readily processable at an ever smaller width (2 mm wide), an ever lesser thickness and an ever lower weight.

The same applies to the use of electroconductive transfer tapes in connection with the electromagnetic screening of housings or rooms. In this case it is frequently necessary to bond very thin electroconductive sealing profiles to the housing. This likewise requires very narrow transfer tapes which, moreover, are also economically rational. For electromagnetic screening in aircraft, very light transfer tapes are particularly advantageous for the bonding of the conductive, screening textiles.

The object of the invention was to provide an electroconductive transfer tape from which the disadvantages of the prior art are absent or in which said disadvantages are at least not present to the same extent.

To achieve this object the invention proposes, as backing material for an electroconductive transfer tape, the use of a spunbonded nonwoven as characterized in more detail in the claims.

The spunbonded nonwoven is first of all metallized by the application of at least one layer of metal, preferably silver, which is applied with a basis weight of from 2 $g/m^2$ to 25 $g/m^2$, in particular from 4 $g/m^2$ to 12 $g/m^2$, thus ensuring the isotropic conductivity of the transfer tape.

Metals other than silver can also be used for the metal layer. Copper and nickel, for instance, are particularly suitable. In addition, double layer of metal, preferably copper on nickel or silver on copper, exhibit the desired properties.

In addition, the nonwoven is provided on both sides with an adhesive coating, the mean thickness of the nonwoven being at least as great as the sum of the thicknesses of the two adhesive coats.

The backing material employed for an electroconductive transfer tape is preferably a spunbonded nonwoven having a basis weight of from 2 $g/m^2$ to 50 $g/m^2$ in particular from 5 $g/m^2$ to 15 $g/m^2$, and having a thickness of from 30 $\mu$m to 200 $\mu$m, in particular from 50 $\mu$m to 150 $\mu$m.

The nonwoven can consist of polyamide, polyester, polyurethane or polyimide.

Alternatively, the nonwoven can be provided on only one side with an adhesive coating.

As a process for preparing an electroconductive transfer tape according to the invention, a transfer process is preferably used as the application process for the adhesive compositions. In the first step, the adhesive compositions are applied first to a film and then are dried on the film. Then adhesive compositions are applied from the film to the spunbonded nonwoven which is coated beforehand with a metal. Instead of a film, a release paper can also be used. In this way, the adhesive compositions are able to sink into the preferably very loosely spunbonded nonwoven. At a very large number of points on both surfaces, therefore, the nonwoven projects from the adhesive composition and is therefore able to produce an electrical contact with the surface.

In the case of the transfer tape provided with an adhesive coating on only one side, the adhesive composition applied to the nonwoven is additionally pressed by means of a pressing roll into the nonwoven in order to ensure that the surface of the nonwoven still protrudes at least in part from the adhesive composition.

Particularly suitable nonwovens for a transfer tape according to the invention are very thin, loosely and open spunbonded nonwovens possessing sufficient free volume to accommodate the adhesive composition. In the case of a nonwoven which was too dense, the adhesive composition would only lie on the top side as a compact layer and would lead to insulation in the z direction.

Since customary nonwovens which are both thin and open are, however, no longer stable, the spunbonded nonwovens used differ from other nonwovens by having long filaments. These nonwovens attain outstanding tear strength and stability even at very low thicknesses and in loosely spun form, so that they are outstandingly suitable as backing material for a dimensionally stable, electroconductive transfer tape which couples high strength with low weight. The spunbonded nonwoven is stable enough to be processed to a low-width transfer tape which is easy to bond.

The use of a loose spunbonded nonwoven of sufficient strength also offers economic advantages, since there are only few filaments per unit volume and, unlike dense nonwovens or wovens, only a small amount of silver per square meter of nonwoven is necessary in order to produce sufficiently thick and conductive layers of silver on the filaments.

By using a subsequently silverized nonwoven instead of, say, silverized fibers, the product attains not only an improved stability but also an increased adhesive force:

The addition of electroconductive materials, such as powders or fibers, is known to lead to a reduction in the adhesive force, since the level of filling required for adequate conductivity can be up to 30% by weight. Since these particles also rise to the surface of the adhesive layer, they reduce the tack of the product. The use of abovementioned nonwovens implies, depending on the grade of the nonwoven, a proportion of electroconductive material of only from 10 to 20% by weight and, accordingly, an improved tack.

By using a subsequently metallized nonwoven, the conductivity of the product is also improved relative to the use of fibers or other additives, since electrical contact comes about not by chance mutual contact between the particles but by virtue of the highly electroconductive network.

The use of a flexible network, moreover, offers advantages relative to the use of spherical particles as conductive components (for example in anisotropically conductive adhesive compositions). If pressure is exerted on electrical contacts which are bonded by means of an electroconductive transfer tape containing spherical particles, there may be damage to the conductive metal layer on the spherical body (for example glass or nickel). The silver layer may spall. By using the conductive nonwoven described above with its netlike structure, excessive pressure is cushioned owing to the flexibility of the network, and permanent contact is ensured even under high mechanical stress.

A further advantage of the invention is based on the use of pressure-sensitive adhesives which need not themselves be conductive. This permits the economic production of stable, electroconductive transfer tapes. It is nevertheless possible—if desired—to use additionally electroconductive adhesives with, for example, silverized glass or metal beads or other conductive components.

The thickness of the two layers of adhesive should be chosen such that the sum of the two layers of adhesive is not greater than the mean thickness of the nonwoven, so that the electroconductive nonwoven still projects from the adhesive and is not completely surrounded by it.

On the other hand, however, it should also not be too thin, so as to provide sufficient adhesive force of the nonwoven. This is not the case if, for example, a very loose nonwoven is coated with a thin layer of adhesive composition, and this composition would sink too greatly into the nonwoven. For example, in the case of a nonwoven having a thickness of about 90 $\mu$m, the overall thickness of the layers of adhesive composition should be between 10 $\mu$m and 90 $\mu$m, preferably between 30 $\mu$m and 65 $\mu$m.

The transfer tape can be used for the electrically conductive bonding of electrical contacts or conductive textiles in electromagnetic screening. Its strength and low weight make it particularly suitable for EMC in aircraft construction.

The intention of the text below is to illustrate the transfer tape according to the invention, using examples, without thereby wishing to limit the invention unnecessarily.

EXAMPLES

Example 1

The nonwoven used is a silverized nonwoven from Statex which is obtainable under the trade name "Cerex®". This nonwoven fabric comprises conventional nylon 6.6 fibers and is coated with 6 g/m$^2$ silver. The thickness is 90 $\mu$m and the basis weight is 16 g/m$^2$.

The nonwoven also has the following characteristic parameters:

| | |
|---|---|
| surface conductivity (acc. to ASTM D 257) | 50 m$\Omega$/inch$^2$ |
| tear strength | |
| in machine direction | greater than 5 N/cm |
| in cross-machine direction | greater than 1 N/cm |
| elongation of break | |
| in machine direction | greater than 30% |
| in cross-machine direction | greater than 30% |

An acrylate polymer solution, consisting of a butyl acrylate-ethylhexyl acrylate-acrylic acid copolymer dissolved in a customary solvent mixture, is applied to an antiadhesive film and dried to produce a pressure-sensitive adhesive having a layer thickness of 35 $\mu$m. This pressure-sensitive adhesive layer is laminated with the abovementioned nonwoven and the nonwoven is laminated on the other side with a second layer of the pressure-sensitive adhesive, of equal thickness.

This produces an electrically conducting transfer tape between two release films, one of which is removed and is used again, since the other release film is antiadhesively treated on both sides and thus the product is wound up on itself.

The adhesive force of the transfer tape is 6.8 N/cm (measured in accordance with ASTM D 1000), and the specific breakdown resistance is 1.1 Ω*cm (measured in accordance with ASTM D 2739).

Example 2

All operations correspond to those of Example 1 except that only one layer of pressure-sensitive adhesive is applied to the nonwoven. A pressure-sensitive layer having a thickness of 75 μm is prepared, is applied to the nonwoven and is pressed into the nonwoven by means of a pressing roll.

The adhesive force of the transfer tape is 5.7 N/cm (measured in accordance with ASTM D 1000), and the specific breakdown resistance is 1.2 Ω*cm (measured in accordance with ASTM D 2739).

We claim:

1. A spunbonded nonwoven backing material for an electroconductive transfer tape, wherein the nonwoven is metallized by the application of at least one layer of metal,
   the nonwoven is provided on one or both sides with an adhesive coating,
   the mean thickness of the nonwoven is at least as great as the total thickness of said adhesive coating on said one or both sides and said metallized nonwoven projects from the adhesive coating.

2. The backing material according to claim 1, wherein the layer of metal used is a silver layer which is applied with a basis weight of from 2 g/m² to 25 g/m².

3. The backing material according to claim 1, wherein the layer of metal used is a layer of copper or nickel.

4. The backing material according to claim 1, wherein the layer of metal is a double layer of metal consisting of copper on nickel or silver on copper.

5. The backing material according to claim 1, wherein the nonwoven has a basis weight of from 2 g/m² to 50 g/m².

6. The backing material according to claim 1, wherein the nonwoven has a thickness of from 30 μm to 200 μm.

7. The backing material according to claim 1, wherein the nonwoven is a member of the group consisting of polyamide, polyester, polyurethane and polyimide.

8. The backing material according to claim 1, wherein the nonwoven is provided on only one side with an adhesive coating.

9. Process for preparing an electroconductive transfer tape according to claim 1, wherein
   a) a spunbonded nonwoven is coated with a metal,
   b) adhesive compositions are coated onto a film or a release paper,
   c) adhesive compositions are dried on the film or release paper, and then
   d) adhesive compositions are applied from the film or release paper onto both sides of the nonwoven.

10. Process for preparing an electroconductive transfer tape according to claim 8, wherein
   a) a spunbonded nonwoven is coated with a metal,
   b) an adhesive composition is coated onto a film or a release paper,
   c) an adhesive composition is dried on the film or release paper,
   d) an adhesive composition is applied from the film or release paper onto one side of the nonwoven, and then
   e) an adhesive composition is pressed into the nonwoven by means of a pressing roll.

* * * * *